(12) United States Patent
Van Den Brink et al.

(10) Patent No.: US 8,765,200 B2
(45) Date of Patent: Jul. 1, 2014

(54) METHOD FOR THE PRODUCTION OF A WINE WITH LOWER CONTENT OF ALCOHOL

(75) Inventors: Johannes Maarten Van Den Brink, Herlev (DK); Kristine Bjerre, Copenhagen (DK)

(73) Assignee: Chr. Hansen A/S, Hoersholm (DK)

( * ) Notice: Subject to any disclaimer, the term of this patent is extended or adjusted under 35 U.S.C. 154(b) by 347 days.

(21) Appl. No.: 12/864,557

(22) PCT Filed: Dec. 22, 2008

(86) PCT No.: PCT/EP2008/068161
§ 371 (c)(1),
(2), (4) Date: Sep. 6, 2010

(87) PCT Pub. No.: WO2009/095137
PCT Pub. Date: Aug. 6, 2009

(65) Prior Publication Data
US 2011/0014318 A1  Jan. 20, 2011

(30) Foreign Application Priority Data
Jan. 29, 2008  (EP) ................................. 08101051

(51) Int. Cl.
*C12G 1/00* (2006.01)
(52) U.S. Cl.
USPC .................. 426/15; 426/10; 426/11; 426/12; 426/14; 426/330.4; 426/330.5; 426/590; 426/592
(58) Field of Classification Search
USPC ............. 426/10, 11, 12, 14, 15, 330.4, 330.5, 426/590, 592
See application file for complete search history.

(56) References Cited

U.S. PATENT DOCUMENTS

| 4,675,191 A | 6/1987 | Villettaz |
| 2003/0021866 A1 | 1/2003 | Antrim |

FOREIGN PATENT DOCUMENTS

| EP | 0 194 043 | 9/1986 |
| JP | 03-003008 B2 | 1/2000 |
| JP | 2001-046047 A | 2/2001 |
| WO | WO 2006/101832 A2 | 9/2006 |

OTHER PUBLICATIONS

International Search Report PCT/EP2008/068161 dated Feb. 19, 2009.
P. Buzzini et al., "Utilization of Grape Must and Concentrated Rectified Grape Must to Produce Acid by *Aspergillus niger* in Batch Fermentations", Biotechnology Letters, vol. 15, No. 2, 1993, pp. 151-156.
Bisson, "Stuck and Sluggish Fermentation", Am. J. Enol. Vitic., vol. 50, No. 1, 1999, pp. 107-119.
Gafner et al."Impact of glucose-fructose-ration on stuck fermentation: Practical experiences to restart stuck fermentations", Wein-Wissenschaft Y. 1996, vol. 51, No. 3-4, pp. 214-218(abstract).
Guillaume et al., "Molecular Basis of Fructose Utilization by the Wine Yeast *Saccharomyces cerevisiae*: a Mutated HXT3 Allele Enhances Fructose Fermentation", Applied and Environmental Micorbiology, Apr. 2007, p. 2432-2439.
Schutz et al., "Lower Fructose Uptake Capacity of Genetically Characterized Strains of *Saccharomyces bayanus* Compared to Strains of *Saccharomyces cerevisiae*: A Likely Cause of Reduced Alcoholic Fermentation Activity", Am. J. Enol. Vitic., vol. 46, No. 2, 1995, pp. 175-180.
EP Application No. 08872002.4, Opposition dated Feb. 17, 2012.

*Primary Examiner* — Vera Stulii
(74) *Attorney, Agent, or Firm* — Foley & Lardner LLP

(57) ABSTRACT

A method for production of a wine with lower content of alcohol involving treating unfermented grape juice with glucose oxidase and glucose isomerase.

14 Claims, 1 Drawing Sheet

*In grapes:*
Sugar is roughly 1:1 ratio of Glucose and Fructose

| *PRIOR ART – US4675191* | *INVENTION – Bold new elements* |
|---|---|
| *Before yeast fermentation:* | *Before yeast fermentation:* |
| Glucose oxidase to grapes: | Glucose oxidase to grapes: |
| Glucose + $O_2$ => gluconic acid + $H_2O_2$ | Glucose + $O_2$ => gluconic acid + $H_2O_2$ |
| | Glucose isomerase to grapes: |
| | Glucose <=> Fructose |
| *Yeast fermentation:* | *Yeast fermentation:* |
| Less glucose => less alcohol in wine | Less glucose and fructose=> significant less alcohol in wine |
| | Ratio glucose/fructose maintained at ratio 1:1 => avoid stuck alcoholic fermentations |
| *After yeast fermentation:* | *After yeast fermentation:* |
| Optionally remove gluconic acid | Optionally remove gluconic acid |

METHOD FOR THE PRODUCTION OF A WINE WITH LOWER CONTENT OF ALCOHOL

CROSS-REFERENCE TO RELATED APPLICATIONS

This application is the U.S. national phase of PCT/EP2008/068161 filed Dec. 22, 2008; which claims priority from European Application No. 08101051.4 filed Jan. 29, 2008. The subject matter of each of the above-referenced application is incorporated in entirety by reference.

FIELD OF THE INVENTION

The present invention relates to a method for production of a wine with lower content of alcohol involving treating unfermented grape juice with glucose oxidase and glucose isomerase.

BACKGROUND ART

Due to global warming grapes worldwide contain more sugar. This sugar is converted to alcohol in the alcoholic fermentation, resulting in wines with increased alcohol levels.

In line of this, one of the major problems in the wine industry today is the high ethanol levels. Ethanol levels at 15-16% (V/V) destroy the sensorial quality of a wine and sometimes put the wine into a higher tax classification than intended. The elevated ethanol levels seen over the last decades are a consequence of rising sugar levels in harvested grapes. Today, wines with an ethanol content above 16% (V/V) are no longer a rarity, and sugar levels are forecasted to increase even more with the global warming.

Important wine areas that are currently believed to be negatively affected by the global warming are important areas such as Rioja (Spain), Chianti (Italy), Hunter Valley (Australia) and Southern California.

Current methods for ethanol reduction like reverse osmosis, spinning cone or dilution are not satisfactory. These methods may have adverse effects on the sensorial quality of the wine. Furthermore is the price of up to 1 USD/gallon for re-verse osmosis of wine a major limitation for a wider use of this approach.

U.S. Pat. No. 4,675,191 (Novo Industri, Denmark—published 1987) describes a method for reducing alcohol content in wine that involves use of the enzyme glucose oxidase. With respect to the described method column 2, lines 25-29 read:

"The method of this invention comprises treating unfermented grape juice with glucose oxidase in the presence of oxygen, thereby converting glucose in the grape juice into gluconic acid and thereafter fermenting the so-treated grape juice."

The herein main relevant technical elements of this prior art method are schematically illustrated in FIG. 1.

SUMMARY OF THE INVENTION

The problem to be solved by the present invention is to provide a new method for reducing the alcohol content of wine, wherein the method may give significantly less alcohol in the wine. Further, the method significantly decreases the risk of unwanted stuck alcoholic fermentations.

The solution is based on that the present inventors have identified that a glucose oxidase based method of the art can be significantly improved by also including use of glucose isomerase.

A schematic comparison of the method of U.S. Pat. No. 4,675,191 and the method of the invention is illustrated in FIG. 1.

In a working example herein can be seen that a process only using glucose oxidase gave a total sugar reduction of around 12% and extra addition of glucose isomerase significantly increased this to a sugar reduction of around 19%. Less sugar in the grape juice implies less alcohol content in the wine.

Further, the inventors found that the extra addition of glucose isomerase helped to maintain the ratio glucose/fructose in the grape juice at around 1:1, which significantly decreases the risk of unwanted stuck alcoholic fermentations. For further details, see working example herein.

It is known to the skilled person that if the glucose/fructose ratio in the grape juice is significantly different from 1:1 one may get stuck alcoholic fermentations, i.e. the yeast is not fermenting all the sugar and one may therefore get a too sweet wine.

As known to the skilled person an important commercial relevant application of glucose isomerase is to convert glucose into fructose for instance in order to make high fructose syrup (fructose is sweeter than glucose).

In line of this, the present inventors were actually surprised that addition of glucose isomerase gave such a positive result (significantly less sugar=>less alcohol in wine). One reason for this was that glucose isomerase may prima facie be seen as a enzyme that can "remove/convert" too much glucose and the glucose oxidase would therefore have less available substrate (glucose oxidase does not work on fructose).

However, as shown in the working examples herein addition of glucose isomerase gave very positive results.

Without being limited to theory, it is believed that the following could be a theoretical explanation for why addition of glucose isomerase gives very positive results.

Glucose oxidase (EC 1.1.3.4) catalyzes following reaction in the grape juice:

Within the grape juice the generated "D-glucono-1,5-lactone" is spontaneously converted into gluconic acid. Accordingly, D-glucono-1,5-lactone is removed and the equilibrium is therefore going to the right=>glucose is removed from the grape juice.

If the enzyme preparation also has catalase activity the created $H_2O_2$ is also removed=>equilibrium is therefore going even more to the right=>more glucose is removed. Involvement of catalase activity is a preferred embodiment herein—see discussion below.

Catalase (EC 1.11.1.6) catalyzes the reaction:

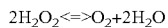

In relation to the method as described herein is glucose isomerase EC 5.3.1.5 (official name Xylose isomerase). The official name for this EC 5.3.1.5 class is xylose isomerase. However, as known to the skilled person as an alternative name it may also be called glucose isomerase. Glucose isomerase is for instance the name used in relevant commercial products of this enzyme class, such as e.g. the commercial product used in working examples herein.

The herein relevant and well known reaction catalyzed by glucose isomerase in the grape juice is the following:

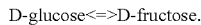

As known to the skilled person this enzyme class may also catalyze the reaction:

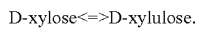

This xylose related reaction is less relevant herein.

One theory is that the glucose removed by the glucose oxidase then creates a situation in the grape juice, where the glucose/fructose ratio gets lower than 1:1 (one gets "too much" fructose—"too little" glucose). The glucose isomerase equilibrium is consequently "forced" to the left=>fructose is converted to glucose to "recover" the glucose/fructose ratio of 1:1=>the glucose oxidase gets "newly" created glucose to work on and thereby more sugar is globally removed (both glucose and fructose) from the grape juice.

As discussed above, the maintenance of the glucose/fructose ratio of 1:1 also has the advantage of significantly reducing the risk of stuck alcoholic fermentations.

Before yeast alcoholic fermentation $O_2$ is present in the unfermented grape juice. As known to the skilled person, normal yeast fermentation generally consists of two parts:

Part 1

Aerobic growth (Oxygen is present)

This is the initial rapid growth process where the yeast doubles its cell number roughly every 4 hours. (Usually 24-72 hours)

Part 2

Anaerobic fermentation (No oxygen present)

Slower activity and the yeast ferments sugar (both glucose and fructose), converting it to alcohol (sugar=>2 ethyl alcohol+2 $CO_2$) rather that increasing the number of yeast cells. (This process can take from days to weeks depending on the yeast and the recipe).

Accordingly, during the yeast fermentation the $O_2$ will sooner or later disappear. The glucose oxidase needs $O_2$ for activity. However, the glucose isomerase is active with or without the presence of $O_2$. Accordingly, glucose isomerase can also help to maintain the glucose/fructose ratio of 1:1 during the actual yeast alcohol fermentation.

Accordingly, a first aspect of the invention relates to a method for production of a wine with lower content of alcohol, which comprises following steps:

(1): treating unfermented grape juice with an effective amount of the following two enzymes:
  (a) glucose oxidase in the presence of oxygen for a period of time adequate to convert at least a portion of the glucose in the grape juice into gluconic acid; and
  (b) glucose isomerase for a period of time adequate to convert at least a portion of the fructose in the grape juice into glucose; and thereafter, (2): the thus treated grape juice with reduced amounts of glucose and fructose is fermented to produce the wine with lower content of alcohol.

Definitions

All definitions of herein relevant terms are in accordance of what would be understood by the skilled person in relation to the herein relevant technical context.

The term "lower content of alcohol" in relation to a wine produced according to the method of the first aspect relates herein to a lower content of alcohol in the wine as compared to a wine produced under identical conditions but without the treatment with both of the two enzymes of step (1) of the first aspect. In fact this term may be seen as directly relating to using an effective amount of the two enzymes.

If an effective amount of glucose oxidase is used at least a portion of the glucose will be removed from the grape juice and thereby less alcohol in the wine is obtained. Similarly, for an effective amount of glucose isomerase, which converts at least a portion of the fructose in the grape juice into glucose=>this created glucose is then removed by the glucose oxidase=>thereby less alcohol in the wine.

Embodiment of the present invention is described below, by way of examples only.

DRAWINGS

FIG. 1: A schematic illustration/comparison of the method of U.S. Pat. No. 4,675,191 and the method of the invention.

DETAILED DESCRIPTION OF THE INVENTION

Lowering/Reducing Alcohol Amounts

In essence the method as described herein may be used to make a wine with virtually any desired lower content of alcohol.

For instance it may be a so-called light wine with an alcohol content of around 6-7%.

As discussed above, due to global warming grapes worldwide contain more sugar resulting in wines with increased alcohol levels. This may be unwanted for different reasons like poor taste or different tax classification.

Accordingly, in a preferred embodiment the wine with lower content of alcohol, produced as described herein, will actually have an alcohol content which is considered to be normal for a red/white wine today—e.g. 12-14%.

Said in other words, the same wine would have too high an alcohol percentage (e.g. 15-17%) if it had been made without the enzyme treatment as described herein.

The wine may be any relevant type of wine such as white wine, red wine, still wine or sparkling wine.

Gluconic Acid:

Treatment of unfermented grape juice with glucose oxidase generates gluconic acid, which is non-fermentable by yeast and therefore gluconic acid appears in the wine. As known to the skilled person gluconic acid may give unsatisfactory organoleptic properties to the wine.

Accordingly, an embodiment the method of the first aspect comprises an optional step (3) of removing at least a portion of the gluconic acid to get a wine with satisfactory organoleptic properties.

In an embodiment the gluconic acid is removed by means of neutralization by addition of a substance forming a sparingly soluble salt of gluconic acid, preferably calcium carbonate. Calcium carbonate is inexpensive and is already used as a chemical deacidification agent for wines, and precipitated gluconic acid salts, mainly calcium gluconate, can easily be removed by filtration. As the wine has to be filtered anyway, this neutralization does not introduce any extra filtration step into the winemaking process.

As known to the skilled person, wines with high alcohol content are often lacking acidity. This means that for such wines it may actually be preferred not to remove the gluconic acid.

Glucose Oxidase and Glucose Isomerase

The glucose oxidase and glucose isomerase to be used in a method as described herein may be obtained from numerous different suitable sources such as relevant commercially available enzyme products.

As known to the skilled person there are numerous different commercially available glucose oxidase/isomerase enzyme products on the market with enzymes that work within the normal conditions of winemaking (e.g. relevant pH values, temperature etc).

In the working examples below the following commercially available enzyme products were used:
  glucose oxidase: Hyderase® (from Amano)
  glucose isomerase: Product from Sigma (# G4166-50g).
    Catalogue number—see a working example herein.

An advantage of the Hyderase® product is that is also comprises catalase activity.

Catalase Activity

As discussed above, the use of an enzyme preparation with catalase activity in the method as described herein may also result in the removal of the $H_2O_2$ created by glucose oxidase.

Hydrogen peroxide ($H_2O_2$) may result in an unwanted wine color and may therefore not be a desirable component in the wine.

Furthermore, as discussed above, by removing $H_2O_2$ one may get the glucose oxidase equilibrium moved even further to the left=>more glucose is removed.

Accordingly, in a preferred embodiment of step (1) of the first aspect the grape juice is also treated with an effective amount of a preparation with catalase activity for a period of time adequate to convert at least a portion of the $H_2O_2$ in the grape juice into $O_2+H_2O$.

Preferred Production Parameters—Step 1 of First Aspect

As known to the skilled person, changes in the winemaking procedures alter the organoleptic properties of the wine product. Therefore, the close-fit between the usual winemaking procedures and practice of the method as described herein is preferred. Insofar as possible, nothing is done through practice of this invention to alter taste and bouquet of the wine.

Enzyme catalyzed processes are usually conducted within the pH optimum of the enzyme. Preferred practice of this invention is to treat unfermented grape juice without adjusting the its pH. Fortunately, suitable relevant commercially available products of the enzymes as used herein exhibit adequate activity and stability in the pH range 3-4 usual to unfermented grape juice.

It is to be understood that any enzyme as described herein can be used in the method according to the invention, provided that it exhibits a reasonable relevant activity and stability at the pH and temperature prevailing during the method for producing wine. Thus, both soluble and immobilized enzyme preparations may be used, even if soluble enzyme preparations are usually preferred.

It is easy for the worker skilled in the art to establish how much enzyme of a given kind is needed for a given juice and a desired sugar conversion.

For instance, depending on the details of treatment times and temperatures:
(i): a glucose oxidase activity roughly between about 1,000 and 50,000,000 international units per hl of grape juice will be appropriate; and
(ii): a glucose isomerase activity roughly between about 100 and 5,000,000 international units per hl of grape juice will be appropriate.

As known to the skilled person an international unit is defined as that amount of the enzyme that catalyses the conversion of 1 micro mole of substrate per minute. The conditions also have to be specified. As known to the skilled person one usually takes a temperature of 30° C. and the pH value and substrate concentration that yield the maximal substrate conversion rate.

Herein the international units are defined as described above and according to the art, i.e. determined at a temperature of 30° C. and the pH value and substrate concentration that yield the maximal substrate conversion rate.

As known to the skilled person it is routine work for the skilled person to determine international units for the enzymes as described herein and it may be determined within a herein relatively minor uncertainty.

For instance, as known to the skilled person, the optimal pH value and optimal substrate concentration may vary for a specific enzyme of interest (e.g. a specific glucose oxidase). However, it is easy to identify this optimal pH and substrate concentration since it is e.g. generally given on the product documentation for a relevant commercial enzyme product. Furthermore, for a specific enzyme of interest it is in general routine work to identify parameters such as optimal pH and substrate concentration.

In a preferred embodiment the following is used:
(i): a glucose oxidase activity roughly between about 15,000 and 5,000,000 international units per hl of grape juice; and
(ii): a glucose isomerase activity roughly between about 5,000 and 500,000 international units per hl of grape juice.

In a preferred embodiment, the temperature during step (1) of first aspect is between 1 and 35° C., preferably between 3 and 30° C. Generally, in enzymatic reactions, the overall reaction rate will increase with temperature, if the temperature is raised from e.g. around 25 to 40° C. In this case, however, more oxygen will be liberated from the liquid, if the temperature is raised from 25 to 40° C., and thus, the overall reaction rate will be reduced under such circumstances. Extended longer treatment at 40° C. could also be detrimental to the quality of the grape juice.

Overall speaking, preferably the only change made in the mechanics of winemaking amounts to a short-term storage of the unfermented grape juice while the (aerated) juice is being treated with glucose oxidase, isomerase and optionally other herein described enzymes. In this connection, it is noted that treatment time rather than enzyme activity may be the controlling parameter. For instance, enough glucose oxidase should be employed to convert the desired proportion of glucose within reasonable treatment time, in which time generally does not exceed 72 hours and many times does not exceed 48 hours. Even if some yeast is present in the unfermented grape juice, it has been found that the fermentation will not initiate to any appreciable degree during the first 48 hours, and thus, it is possible to remove relevant amounts of sugar.

In regard to Step 1 of the first aspect, it is to be noted that the conversion degree is very easily controlled as the reaction of glucose to gluconic acid is stopped almost immediately by cutting the oxygen supply.

Practice of this invention also contemplates instances when the sugar reduced grape juice resulting from Step 1 is kept as an acid supply (acid reserve) and blended with an acid deficient grape juice to improve the organoleptic properties of the resulting wine.

It is to be understood that the removal of the gluconic acid can be performed at any time, such as after the fermentation step.

Alternatively, it may be done by addition of e.g. calcium carbonate before addition of glucose oxidase as described herein. An advantage of this is that the pH increases in the grape juice, and this may generally improve the activity of the glucose oxidase, since it generally has optimal pH around pH neutral.

In a preferred embodiment the relevant enzyme preparation(s) is a solid water soluble preparation, preferably a non-dusting preparation. The storage stability of a solid preparation is better than the storage stability of a liquid preparation, and also, it is unnecessary to add any conservation agents. It is recommended, though, that the user dissolve the solid form agent in a small amount of water immediately before use.

In a preferred embodiment of the method as described herein oxygen is supplied continuously to the grape juice during step 1 of the first aspect. The supply of oxygen has a remarkably great influence on the reaction rate of in particular the glucose oxidase enzymatic reaction. Thus, continuous introduction of oxygen ensures a high reaction rate. Desirably, the oxygen is supplied by means of an air pump, a most efficient means for introducing oxygen into the grape juice.

In a preferred embodiment of the method according to the invention, the amount of glucose oxidase/isomerase preparation added in step 1 is sufficient for generation of the wanted reduction of sugar concentration in a period of time not exceeding around 72 hours. As it has already been pointed out, even if some yeast is present in the grape juice, fermentation will not progress to any appreciable degree during the first 48 hours, and thus, no appreciable amount of glucose/fructose is simultaneously fermented to alcohol during enzymatic conversion of glucose to gluconic acid.

In a preferred embodiment the effective amount and the period of time for the two glucose oxidase/isomerase enzymes during step (1) is so that:

(A): the sugar content in the grape juice is reduced by at least 10%, more preferably at least 14% and even more preferably at least 17%.

As discussed above, in working examples herein the sugar content (both glucose and fructose) was reduced by 19%.

In a preferred embodiment of the method according to the invention, the pH value in step 1 is not controlled. This embodiment is particularly preferred in instances where a longer treatment time e.g., up to around 72 hours is feasible and is employed.

Due to the fact that the aroma, the taste and the bouquet of the wine are properties which are extremely sensitive, it could not be predicted whether the lower alcohol wine produced according to the invention would possess wanted properties, in as much as the lower alcohol wine produced according to the invention, with soluble glucose oxidase/isomerase preparations, will contain traces of inactive glucose oxidase/isomerase and may differ from ordinary wine in regard to the concentration of other constituents, too. However, it has been found that the lower alcohol wine produced according to the invention possesses all normal properties of wine, including taste and bouquet, except, of course, for properties related directly to the alcohol concentration.

Preferred Production Parameters—Step 2 of First Aspect

Conduct of step 2 of first aspect, i.e., fermentation of the treated grape juice, is an obligatory step of the method of the invention. However, no detailed discussion of the fermentation step needs to be provided here since conduct of conventional winemaking practices are contemplated expressly and those practices are well known to persons skilled in art of enology (oenology). It has already been emphasized herein that imposition of any needless changes in the mechanics of the winemaking process are avoided in preferred practice of this invention.

As discussed above, during the yeast fermentation the $O_2$ will sooner or later disappear. The glucose oxidase needs $O_2$ to work. However, the glucose isomerase can work with or without the presence of $O_2$. Accordingly, glucose isomerase can also help to maintain the glucose/fructose ratio of 1:1 during the actual yeast alcohol fermentation.

In fact this will generally happen during the method as described herein. The glucose isomerase added to the unfermented grape juice during step (1) is normally still active during the yeast alcohol fermentation of step (2).

However, optionally one could add additional glucose isomerase during the yeast alcohol fermentation of step (2).

Accordingly, in an embodiment of the invention of the first aspect additional glucose isomerase is added during the yeast alcohol fermentation step (2).

EXAMPLES

Example 1

Enzymatic Sugar Reduction in Grape Juice—Example of Step (1) of First Aspect

One possible way to reduce the final alcohol content in wine is to reduce the sugar concentration in the grape juice before the alcoholic fermentation. Therefore an enzymatic treatment of the grape juice was performed in order to reduce the total sugar content.

Three independent experiments were performed using two replicates in each case. In each sample 200 ml grape juice (Pinot Blanc 2007, Germany, pasteurized) was added to a glass flask and continuously mixed with a magnetic stirrer. The samples were aerated throughout the experiment.

Either 100 mg glucose oxidase (Hyderase, Amano, >15,000 u/g) or both 100 mg glucose oxidase and 1 g glucose isomerase (Sigma, G4166-50 g, >350 u/g) were added to the flasks. The incubation was allowed to run at room temperature for 3 days.

Samples were taken just before addition of the enzymes and after 3 days. Samples were analyzed for the presence of glucose and fructose using a commercial UV based assay supplied by Boehringer Mannheim/R-biopharm (catalog number 10 139 106 035) following the protocol provided by the manufacturer. The results of this experiment are summarized in Table I below.

TABLE I

Enzymatic sugar (glucose and fructose) reduction in grape juice.

| Day | Treatment | total sugar (g/l) | Reduction total sugar (%) |
|---|---|---|---|
| 0 | GOX | 230 | 0 |
|  | GOX + isomerase | 235 | 0 |
| 3 | GOX | 202 | 12 |
|  | GOX + isomerase | 190 | 19 |

GOX = glucose oxidase

Conclusion

These results of this example 1 show that a process only using glucose oxidase gave a total sugar reduction of around 12% and extra addition of glucose isomerase significantly increased this to a sugar reduction of around 19%. Less sugar in the grape juice implies less alcohol content in the wine.

Example 2

Yeast Fermentation of Treated Grape Juice—Example of Both Step (1) and Step (2) of First Aspect A full simulation of a general winemaking process was done at laboratory scale. In this experiment it was shown that the enzymatic treatment did have an effect on the final alcohol level without negatively influencing major wine production parameters like the alcoholic fermentation or the malolactic fermentation.

The complete experiment was carried out at room temperature, approximately 22° C. Six experiments were performed with each four liters of grape juice (Pinot Blanc 2007, Germany, pasteurized) in fermentation flasks. The pH of the grape juice was not adjusted and no material was added other than the enzymes described in this example.

The grape juice was preincubated for three days with enzymes as described below, followed by the alcoholic fermentation of 11 days and a malolactic fermentation of 10 days.

Enzymatic Treatment

The six flasks were divided in three groups of two flasks.

The grape juice in group 1 was preincubated for three days with 0.5 g/l glucose oxidase (Hyderase, Amano, >15,000 u/g), the grape juice in the second group with 0.5 g/l glucose oxidase and 2 g/l Glucose Isomerase (Sigma, G4166-50g, >350 u/g) and the grape juice in the control group was not treated with enzymes. Following enzyme addition, the flasks were vigorously aerated for three days in the presence of the enzymes, before the alcoholic fermentation was started. Aeration is important since oxygen is required in the glucose oxidase mediated enzymatic conversion.

Alcoholic Fermentation

The alcoholic fermentation was started by inoculation with rehydrated of freeze dried wine yeast (*Saccharomyces cerevisiae* Merit. Ferm, Chr. Hansen, 0.1 g/l) to a final concentration of 9E+05 CFU/ml. Rehydration was performed in peptone water (15 g/l Tryptone, Oxoid L42, 9 g/l NaCl, 1.14 g/12% antifoam 1510, BHD 63215) for 10 minutes at room temperature.

At this point the aeration was stopped and the process became depleted for oxygen during the following days as a result of the yeast metabolism. The alcoholic fermentation was allowed to run for eleven days at room temperature which resulted in almost complete conversion of all sugar to alcohol.

Malolactic Fermentation

Following the alcoholic fermentation, the malolactic fermentation was started. The aim of this part of the process is to convert malate into lactate which results in a more pleasant sensoric sensation and thus is an important part of the wine producing process. The malolactic fermentation is mostly performed by the bacteria *Oenococcus oeni*. It would be highly undesirable if growth of *O. oeni* would be impaired by the enzymatic treatment of the grape juice.

Eleven days after the start of the alcoholic fermentation the malolactic fermentation was started by addition of *O. oeni* (Viniflora, Chr. Hansen. Batch no.: 2711097) to the fermented grape juice. Freeze dried *O. oeni* (0.7 g of 8.2 E+11 CFU/g) was allowed to rehydrate for 10 minutes in 100 ml of peptone water 15 g/l Tryptone, Oxoid L 42.9 g/l NaCl, 1.14 g/12% antifoam 1510, BHD 63215). Three ml were added to 4000 ml of fermented grape juice, resulting in a final concentration of $4.3*10^6$ CFU/ml. This was allowed to stand for another 10 days at room temperature.

Results

Effect of Enzymatic Treatment on Alcohol Levels

Glucose and fructose levels were measured using a commercial UV based assay supplied by Boehringer Mannheim/R-biopharm (catalog number 10 139 106 035), using the protocol supplied by the provider.

TABLE II sugar levels at the start end of the alcoholic fermentation.

| day | Treatment | Glucose (g/l) | Fructose (g/l) | Total sugar (g/l) |
|---|---|---|---|---|
| 0 | Control | 110 ± 3 | 118 ± 1 | 229 ± 4 |
|   | GOX | 96 ± 5 | 124 ± 3 | 225 ± 9 |
|   | GOX + Isomerase | 106 ± 22 | 119 ± 5 | 225 ± 25 |
| 11 | Control | 0 ± 0 | 8 ± 2 | 8 ± 2 |
|   | GOX | 24 ± 17 | 59 ± 11 | 83 ± 27 |
|   | GOX + Isomerase | 0 | 0 | 0 |

Alcohol was measured at different days during the alcoholic fermentation using the Dr. Rebelein titration method as described in the literature (Bestimmung des alkoholgehalts nach Dr. Rebelein. Issued by: C Schliesmann Kellerie-Chemie GmbH & Co. KG, Auwiesenstrasse 5, 74523 Schwäbische Hall (2001)). In the untreated grape juice the fermentation was almost complete, reaching a final alcohol level of 12.7% at the end of the process. When the juice was pretreated with both glucose oxidase and glucose isomerase the sugar fermentation was complete but the final level of alcohol was still significantly lower (11.8%).

The low levels of alcohol found when the juice was pretreated with glucose oxidase only, are a result of incomplete fermentation. The glucose oxidase treated juice in this experiment is not usable in normal winemaking due to the high levels of rest sugar—especially fructose—at the end of fermentation (Table II).

Accordingly, the extra addition of glucose isomerase helped to maintain the ratio glucose/fructose in the grape juice at a ratio around 1:1, which significantly decreases the risk of unwanted stuck alcoholic fermentations as shown when using only GOX.

Further, the experiment with isomerase removed all sugar while some fructose sugar (8 g/l) still was present in the control (untreated grape juice). This demonstrates that isomerase as such prevents stuck fermentations.

TABLE III alcohol levels during the fermentation. At day 11 the malolactic fermentation was started. The alcohol levels in the glucose oxidase (GOX) pre-treated samples are in italics to indicate that these values are the result of a severely delayed alcoholic fermentation.

| Day | Treatment | Alcohol (vol %) |
|---|---|---|
| 0 | Control | 0 |
|   | GOX | 0 |
|   | GOX + Isomerase | 0 |
| 7 | Control | 10.9 ± 0.3 |
|   | GOX | Nd |
|   | GOX + Isomerase | 10.7 ± 0.5 |
| 11 | Control | 12.3 ± 0.1 |
|   | GOX | *7.5 ± 1.3* |
|   | GOX + Isomerase | 11.7 ± 0.1 |
| 16 | Control | 12.7 ± 0.1 |
|   | GOX | *9.3 ± 0.6* |
|   | GOX + Isomerase | 11.8 ± 0.01 |

Nd: not determined

Conclusion

The results of this example 2 shows that GOX+Isomerase significantly lowered alcohol percentage to 11.8% as compared to 12.7 of control.

Further, the extra addition of glucose isomerase helped to maintain the ratio glucose/fructose in the grape juice at a ratio around 1:1, which significantly decreases the risk of unwanted stuck alcoholic fermentations as compared to using GOX alone.

The low levels of alcohol (9.3%) found when the juice was pretreated with glucose oxidase only, are a result of incomplete fermentation—in other words unwanted stuck alcoholic fermentations. The glucose oxidase treated juice in this experiment is not usable in normal winemaking due to the high levels of rest sugar—especially fructose—at the end of fermentation (Table II).

Further, the experiment with isomerase removed all sugar while some fructose sugar (8 g/l) still was present in the control (untreated grape juice). This demonstrates that isomerase as such prevents stuck fermentations.

Example 3

Growth of Yeast During the Alcoholic Fermentation—Addition of Isomerase Significantly Reduces Stuck Alcoholic Fermentation It is known to the skilled person that stuck fermentations typically arise when fructose concentrations are considerably higher than glucose concentrations. During the alcoholic fermentation the glucose/fructose ratio, which is 1/1 at the start of the alcoholic fermentation, may change to a negative value, resulting in a delayed fermentation.

In this example 3 a delayed (stuck) fermentation was induced by treatment of the must with Glucose oxidase alone.

In order to investigate the effect of glucose isomerase on the ability of yeast to grow and survive during an alcoholic fermentation a simulated wine production was performed as described in Example 2 herein. The grape juice was preincubated for three days with enzymes as described below, followed by the alcoholic fermentation of 11 days and a malolactic fermentation of 10 days.

Three independent experiments were performed using two replicates in each case. In each sample 200 ml grape juice (Pinot Blanc 2007, Germany, pasteurized) was added to a glass flask and continuously mixed with a magnetic stirrer. The samples were aerated throughout the experiment.

Either 100 mg glucose oxidase (Hyderase, Amano, >15,000 u/g) or both 100 mg glucose oxidase and 1 g glucose isomerase (Sigma, G4166-50g, >350 u/g) were added to the flasks. The incubation was allowed to run at room temperature for 3 days. After this time point the alcoholic fermentation was started by inoculation with re-hydrated freeze dried wine yeast (Saccharomyces cerevisiae Merit. Ferm, Chr. Hansen, 0.1 g/l) to a final concentration of 9E+05 CFU/ml. Re-hydration was performed in peptone water (15 g/l Tryptone, Oxoid L 42.9 g/l NaCl, 1.14 g/12% antifoam 1510, BHD 63215) for 10 minutes at room temperature. Eleven days after the start of the alcoholic fermentation the malolactic fermentation was started by addition of O. oeni (Viniflora, Chr. Hansen. Batch no.: 2711097) to the fermented grape juice. Freeze dried O. oeni (0.7 g of 8.2 E+11 CFU/g) was allowed to re-hydrate for 10 minutes in 100 ml of peptone water 15 g/l Tryptone, Oxoid L 42.9 g/l NaCl, 1.14 g/12% antifoam 1510, BHD 63215). Three ml were added to 4000 ml of fermented grape juice, resulting in a final concentration of $4.3*10^6$ CFU/ml. This was allowed to stand for another 10 days at room temperature.

The number of S. cerevisiae colony forming units was determined at different time points by taking samples from the fermented grape juice and plating serial dilutions on YGC solid medium agar plates followed by an overnight incubation at 30° C.

Sugar levels were determined using a commercial UV based assay supplied by Boehringer Mannheim/R-biopharm (catalog number 10 139 106 035), using the protocol supplied by the provider.

Results
Effect of Isomerase on a Stuck Alcoholic Fermentation

During the alcoholic fermentation the sugars in the grape juice are converted to ethanol by the yeast S. cerevisiae.

Treatment with glucose oxidase alone was shown to result in a delayed alcoholic fermentation (stuck fermentation) due to delayed growth of S. cerevisiae (as shown in Table IV). In the must pretreated with glucose oxidase, growth of yeast was very poor during the first days of the alcoholic fermentation. The number of CFUs was below the detection limit at day 1 and was approximately 3 log units lower at day 2 of the alcoholic fermentation. This is a clear indication of a stuck fermentation.

This result was supported by the sugar analysis. While in the non-treated must approx. 60% of the sugar was fermented after 3 days of yeast fermentation, less than 10% was fermented in the GOX pre-treated must.

However, when glucose isomerase was present during the pretreatment and alcoholic fermentation, the fermentation process behaved almost identical to the fermentation of untreated must. Both the remaining sugar levels and the S. cerevisiae CFU numbers (Table IV) were comparable to the untreated must. In other words; glucose isomerase was able to overcome the stuck fermentation caused by GOX treatment.

TABLE IV

Viable S. cerevisiae cell count during the alcoholic fermentation. The grape juice had been pretreated for three days as described. Yeast was added at t = 0 days.

| Days | Treatment | CFU/ml (average) | Total sugar (g/l) |
|---|---|---|---|
| 0 | Control | 7.0 ± 1.4E+05 | 229 ± 4 |
|   | GOX | 9.0 ± 4.2E+05 | 225 ± 9 |
|   | GOX + Isomerase | 9.0 ± 1.4E+05 | 225 ± 25 |
| 1 | Control | 6.5 ± 2.1E+05 | |
|   | GOX | Nd | |
|   | GOX + Isomerase | 1.0 ± 0.9E+06 | |
| 2 | Control | 2.2 ± 0.2E+07 | 212 ± 6 |
|   | GOX | 5.0 ± 7.1E+04 | 220 ± 6 |
|   | GOX + Isomerase | 1.1 ± 0.9E+07 | 209 ± 11 |
| 3 | Control | 6.9 ± 0.9E+07 | 86 ± 64 |
|   | GOX | 2.7 ± 3.3E+06 | 207 ± 5 |
|   | GOX + Isomerase | 5.1 ± 1.7E+07 | 96 ± 80 |
| 7 | Control | 3.1 ± 0.9E+07 | 22 ± 10 |
|   | GOX | 3.2 ± 1.1E+07 | 141 ± 55 |
|   | GOX + Isomerase | 4.3 ± 0.3E+07 | 11 ± 8 |
| 9 | Control | 2.7 ± 0.2E+07 | |
|   | GOX | 2.0E ± 0.8 +07 | |
|   | GOX + Isomerase | 1.1 ± 1.6E+07 | |
| 16 | Control | 6.9 ± 6.6E+06 | 2 ± 1 |
|   | GOX | 2.9 ± 1.0E+06 | 53 ± 12 |
|   | GOX + Isomerase | 9.5 ± 9.2E+05 | 0 ± 0 |
| 18 | Control | 2.5 ± 0E+05 | |
|   | GOX | 4.0 ± 2.1E+06 | |
|   | GOX + Isomerase | 2.0E+05 | |

Nd = below detection limit.

Conclusion

As shown in this example 3 use of GOX alone may induce significant unwanted stuck fermentation.

The results of this example 3 show that addition of isomerase can help to overcome the negative effects of addition of GOX on the growth of S. cerevisiae generally used for wine production.

REFERENCES

1. U.S. Pat. No. 4,675,191 (Novo Industri, Denmark—published 1987)

The invention claimed is:
1. A method for production of a wine with lower content of alcohol, which comprises the following steps:
   (1): treating unfermented grape juice with an effective amount of:
   (a) glucose oxidase in the presence of oxygen, for a period of time adequate to convert at least a portion of glucose in the grape juice into gluconic acid, and
   (b) glucose isomerase for a period of time adequate to convert at least a portion of fructose in the grape juice into glucose; and thereafter

(2): fermenting the treated grape juice to produce the wine with lower content of alcohol.

2. The method of claim 1, wherein the produced wine has an alcohol content of about 12% to about 14%.

3. The method of claim 1, further comprising removing at least a portion of the gluconic acid to get a wine with satisfactory organoleptic properties; and wherein the gluconic acid is removed by adding a substance that forms a sparingly soluble salt of gluconic acid.

4. The method of claim 1, wherein the effective amount and the period of time for the two glucose oxidase/isomerase enzymes during step (1) is such that:
(A): the sugar content in the grape juice is reduced by at least 10%.

5. The method of claim 4, wherein the sugar content in the grape juice is reduced by at least at least 17%.

6. The method of claim 1, wherein the effective amount and the period of time for glucose oxidase/isomerase enzymes during step (1) are such that the sugar content in the grape juice is reduced by at least 10%, wherein:
the period of time is 72 hours or less; and
the effective amounts for the glucose oxidase/isomerase enzymes are:
(i): a glucose oxidase activity between 1,000 and 50,000,000 international units per hl of grape juice; and
(ii): a glucose isomerase activity between 100 and 5,000,000 international units per hl of grape juice; and
the temperature during step (1) is between 1 and 35° C.

7. The method of claim 1, wherein oxygen is supplied continuously to the grape juice during step 1 of claim 1.

8. The method of claim 1, wherein in step (1) further comprises treating the grape juice with an effective amount of a preparation with catalase activity for a period of time adequate to convert at least a portion of the $H_2O_2$ in the grape juice into $O_2 + H_2O$.

9. The method of claim 1, further comprising adding additional glucose isomerase during step (2).

10. The method of claim 1, wherein the wine is white wine, red wine, still wine or sparkling wine.

11. The method of claim 2, wherein the alcohol content is at least 3% lower than if the grape juice had not been treated with glucose oxidase and glucose isomerase.

12. The method of claim 3, wherein the substance is calcium carbonate.

13. The method of claim 6, wherein the temperature during step (1) is between 3 and 30° C.

14. The method of claim 7, wherein the oxygen is supplied by an air pump.

* * * * *